United States Patent [19]

Vandenberg et al.

[11] Patent Number: 4,993,831
[45] Date of Patent: Feb. 19, 1991

[54] CLOSED LOOP FOUCAULT KNIFE-EDGE TEST

[75] Inventors: Donald E. Vandenberg, Brockport; William D. Humbel, Rochester; Thomas W. Dey, Rochester; John G. Pitek, Rochester, all of N.Y.

[73] Assignee: Eastman Kodak Company, Rochester, N.Y.

[21] Appl. No.: 496,732

[22] Filed: Mar. 21, 1990

[51] Int. Cl.$^5$ .............................................. G01B 9/00
[52] U.S. Cl. ................................................... 356/124
[58] Field of Search ............... 356/124, 125, 126, 127, 356/129

[56] References Cited

U.S. PATENT DOCUMENTS 2,304,814 12/1942 Glasser .................. 356/126
3,418,477 12/1968 Knutrud et al. ........... 356/124
3,431,352 3/1969 Philbert ................. 356/124
4,272,190 6/1981 Shapiro ................. 356/124

FOREIGN PATENT DOCUMENTS 1103050 3/1961 Fed. Rep. of Germany ...... 356/126

Primary Examiner—F. L. Evans
Attorney, Agent, or Firm—Stephen C. Kaufman

[57] ABSTRACT

The historical Foucault knife-edge test enables one to passively ascertain an optical imaging device's characteristics, for example, whether or not it is a source of optical aberrations. The historical Foucault knife-edge test corresponds to an open loop control system, since a control action, which is that quantity responsible for producing the imaging device characteristic, or open loop output, is independent of that output. The present invention, in sharp contrast to the historical Foucault knife-edge test, discloses a method for closing the Foucault open loop, so that the control action is somehow dependent on the output. In this way, accordingly, dynamic steps can be taken to compensate for, or remove the optical aberrations.

4 Claims, 6 Drawing Sheets

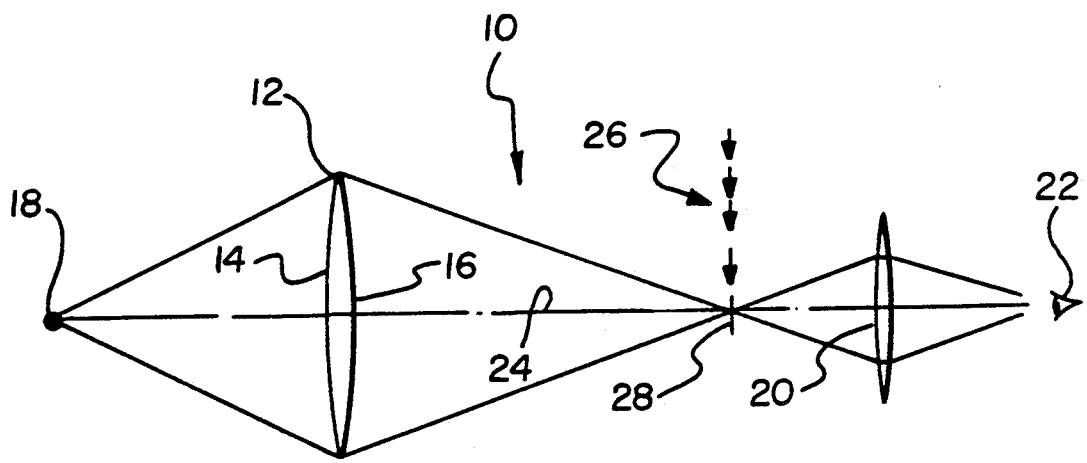
FIG. 1
(PRIOR ART)
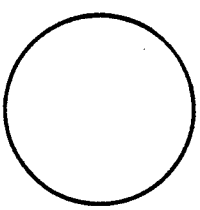
FIG. 2A     FIG. 3A
FIG. 2B     FIG. 3B
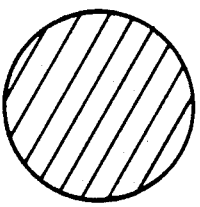
FIG. 2C     FIG. 3C
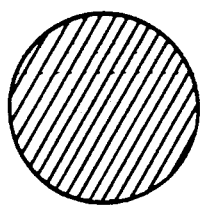
FIG. 2D     FIG. 3D
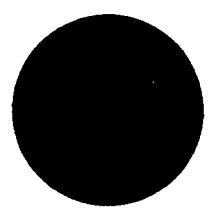

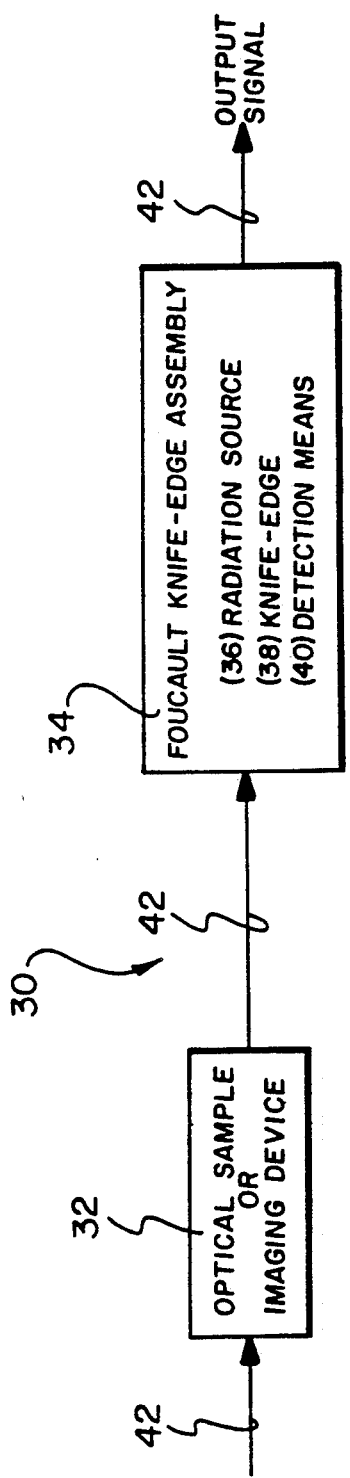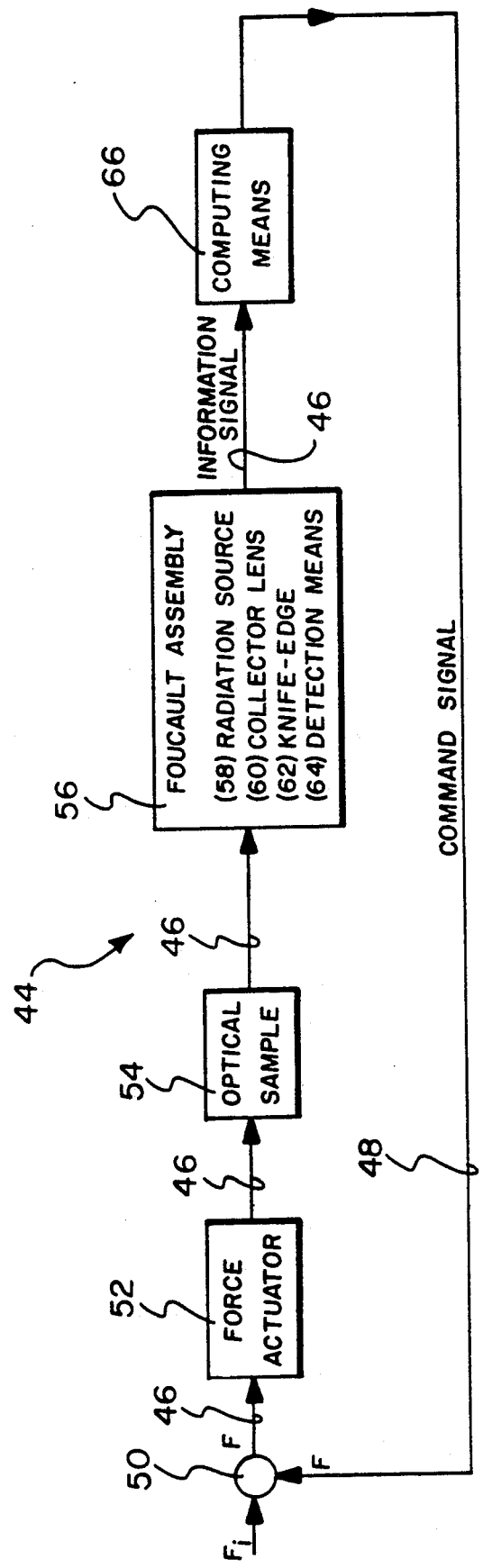

FIG. 7
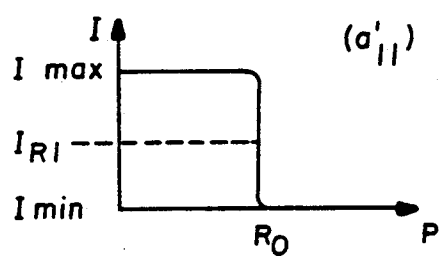
FIG. 7A
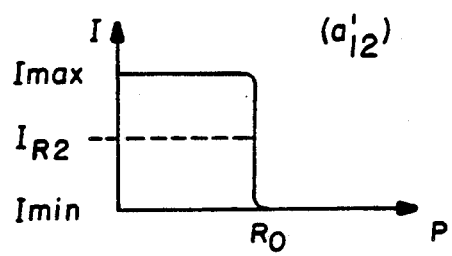
FIG. 7B
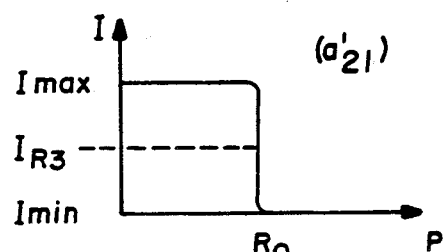
FIG. 7C
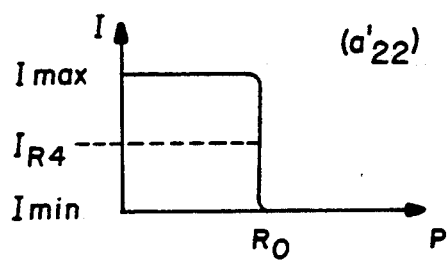
FIG. 7D
FIG. 8
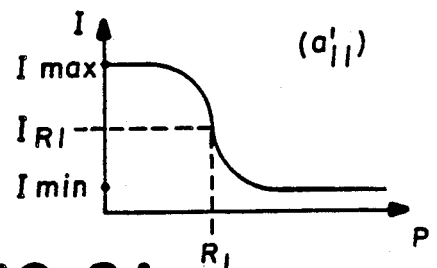
FIG. 8A
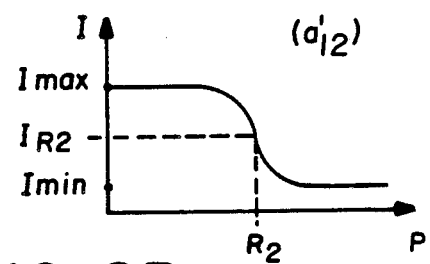
FIG. 8B
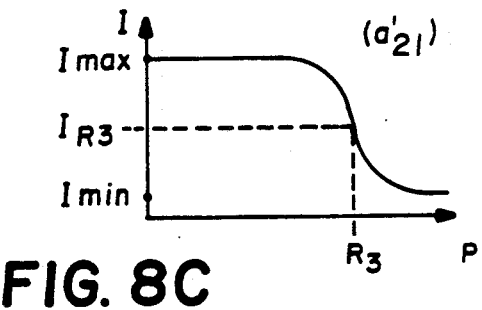
FIG. 8C
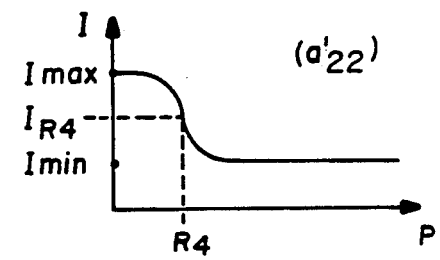
FIG. 8D

FIG. 9
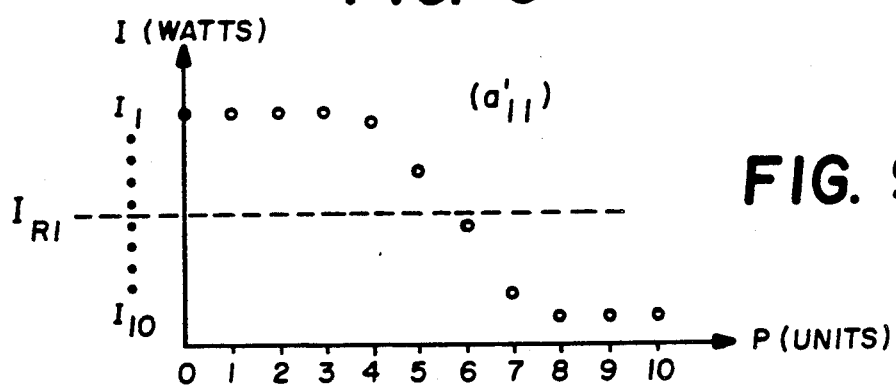
FIG. 9A
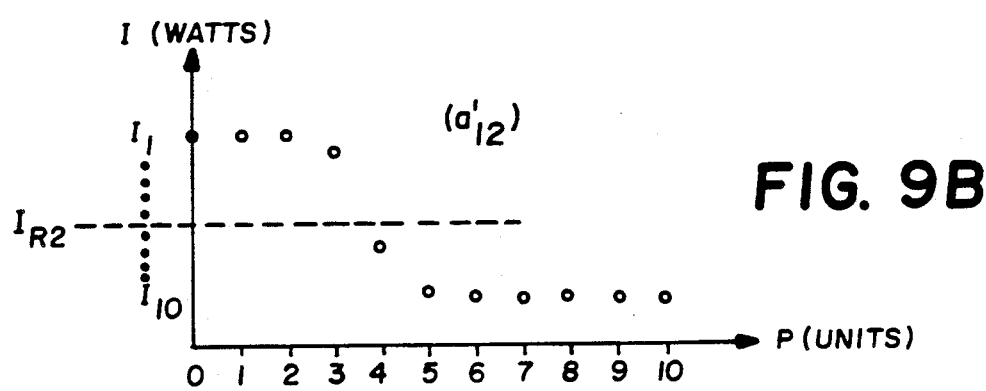
FIG. 9B
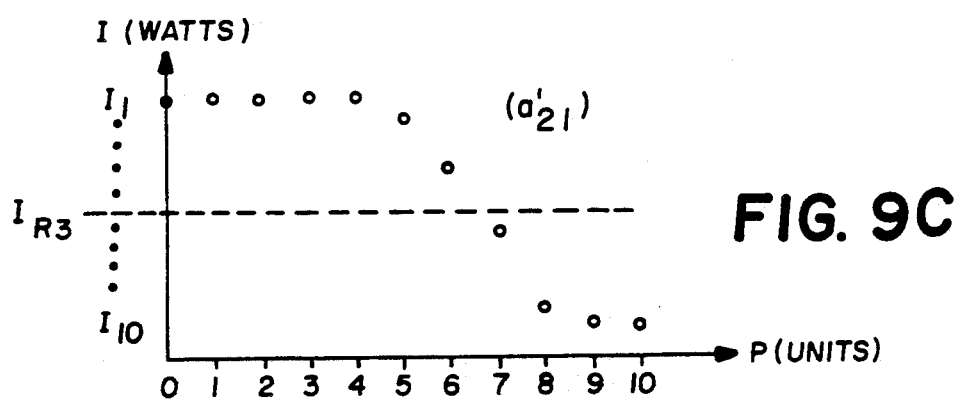
FIG. 9C
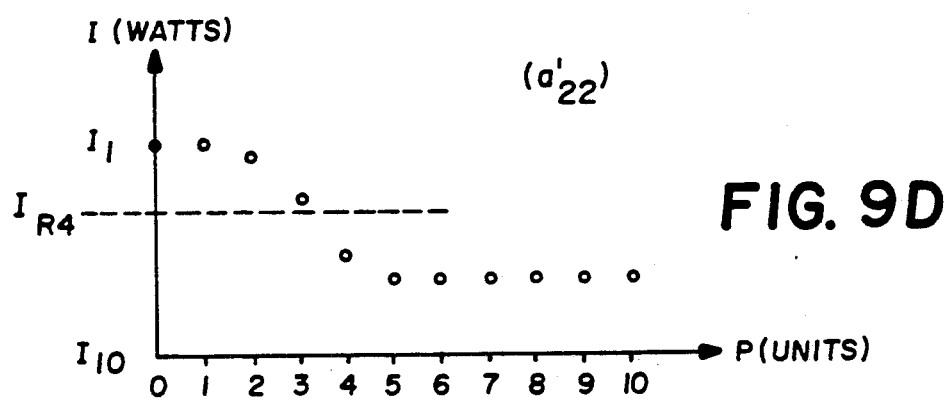
FIG. 9D

CLOSED LOOP FOUCAULT KNIFE-EDGE TEST

CROSS REFERENCE TO RELATED APPLICATIONS

This application is related to U.S. application Ser. No. 07/464,278 filed Jan. 12, 1990, by Vandenberg et al; to U.S. application Ser. No. 07/464,042 filed Jan. 12, 1990 by Pitek et al; to U.S. application Ser. No. 07/485,413 filed Feb. 27, 1990 by Dey et al; and, to U.S. application Ser. No. 07/485,182 filed Feb. 27, 1990 by Humbel et al. The entire disclosures of each of these applications are incorporated by reference herein. Each of these applications is copending and commonly assigned.

FIELD OF THE INVENTION

This invention relates to a method for testing an imaging device.

INTRODUCTION TO THE INVENTION

As disclosed in the above referenced applications, a Foucault knife-edge test has been traditionally understood to be perhaps the classic optical test for an objective, or imaging device.

Attention is directed to FIG. 1, which shows a typical optical assembly 10 for demonstrating the basic principles of the Foucault knife-edge test. The assembly 10 includes a conventional imaging device, or optical sample 12 to be tested. The FIG. 1 optical sample 12 comprises a lens 12, the lens 12 comprising a pair of optical surfaces 14 and 16. The optical assembly 10 further includes a radiation source 18; a collector lens 20; and, a conventional photodetector 22, comprising the human eye. The components of the assembly 10 are aligned to a reference axis 24.

For this optical assembly 10, one may employ the knife-edge test for qualitatively detecting (at the eye/photodetector 22) the presence of transverse aberrations that may have been introduced into the assembly 10 by the lens optical surfaces 14, 16. Accordingly, a knife-edge 26 may be gradually introduced into the assembly 10 (shown by way of the FIG. 1 staggered arrows), so that the knife-edge 26 sequentially cuts and blocks the image of the radiation source 18 at a plane of convergence 28. This action, in turn, removes source rays from their expected trajectories, so that a variable intensity pattern may be registered by the eye. Finally, a comparison of this intensity pattern with a theoretical intensity pattern for an ideal optical surface, can become a qualitative measure of the presence of transverse aberrations introduced by the optical surfaces 14, 16.

SUMMARY OF THE INVENTION

So far, we have stressed that the Foucault knife-edge test can provide a qualitative measure of the presence of transverse aberrations that may have been introduced by the imaging device 12. Attention is now directed to FIGS. 2 and 3, which help to explain what we mean by a qualitative test.

In particular, FIGS. 2A, B, C, D show, in sequence, what the eye can qualitatively perceive when an ideal imaging device is subjected to the Foucault knife-edge test, and the knife-edge is sequentially advanced through four successive knife-edge positions viz:

FIG. 2A: knife-edge position 1=total non-occlusion of the radiation (no shadow);

FIG. 2B: knife-edge position 2=partial occlusion of the radiation (light, uniform shadowing);

FIG. 2C: knife-edge position 3=further occlusion of the radiation (darker, uniform shadowing);

FIG. 2D: knife-edge position 4=total occlusion of the radiation (total shadow).

In summary, FIGS. 2A-D show that, for the ideal imaging device, the eye can qualitatively perceive an ever increasing and uniform shadow pattern or profile. We can say, moreover, that the FIG. 1 collector lens 20 can provide images of the imaging device 12 at a photodetector plane, that is, at the eye, which images are the FIGS. 2A-D shadow patterns.

Now we turn our attention to FIGS. 3A-D, which sequentially show what the eye can qualitatively perceive when a non-ideal imaging device is substituted for the FIG. 2 ideal imaging device, and is subjected to the Foucault knife-edge test. In particular, as the knife-edge is sequentially advanced through four successive knife-edge positions, the eye can sequentially and qualitatively perceive:

FIG. 3A: knife-edge position 1=total non-occlusion of the radiation (no shadow);

FIG. 3B: knife-edge position 2=partial occlusion of the radiation (light, non-uniform shadowing);

FIG. 3C: knife-edge position 3=further occlusion of the radiation (darker, more obscure and non-uniform shadowing);

FIG. 3D: knife-edge position 4=total occlusion of the radiation (total shadow).

In summary, FIGS. 3A-D show that, for the non-ideal imaging device, the eye can qualitatively perceive an ever increasing shadow pattern or profile: the FIGS. 3A-D shadow patterns, in contrast to that of FIGS. 2A-D, are marked by salients consisting of various dark zones with different radii of curvature, and different centers of curvature.

Comparing, therefore, the shadow patterns provided in FIGS. 3A-D, versus those provided in FIGS. 2A-D, one skilled in the art may be enabled to say, based upon his subjective experience, that the FIG. 3 non-ideal imaging device has introduced some transverse aberrations into the assembly 10. A skilled optician may indeed be able to say more, for example, that the FIG. 3 shadow pattern suggests that the aberration is trefoil, or quadrafoil, or astigmatism.

We now make the following observations about the FIGS. 1, 2 and 3. The ability of the optician to use the FIG. 1 Foucault knife-edge test, to the end of being able to analyze the FIGS. 2, 3 shadow patterns, and thus make an assessment of an imaging device's characteristics, is significant, and an important first step. However, we desire to go beyond this first step, to the end of being able to further capitalize on the Foucault assessment, and provide novel steps which can actually compensate for, or remove, the aberrations.

We have discovered, on this last point, that the FIG. 1 Foucault test, in and of itself, is incapable of suggesting, much less teaching, any compensatory or removal step. Why this is so may be understood by reformatting the FIG. 1 Foucault assembly, into an "open loop control system" 30, of the type shown in FIG. 4.

The FIG. 4 Foucault open loop control system 30, in block diagram form, comprises the following components: an optical sample 32, or imaging device; and, a Foucault knife-edge assembly 34. The assembly 34, in turn, includes a radiation source 36; a knife-edge 38; and, a detection means 40. Support optics, like the FIG.

1 collector lens, are not shown. The components 32-40 are connected in series along a forward path 42.

The FIG. 4 Foucault open loop control system 30 is, by definition, a system in which an output signal of the detection component 40, has no effect upon the imaging device component 32; i.e., a control action, which is that quantity responsible for activating the system 30 to produce the output, is independent of the output signal. Accordingly, as implied above, the Foucault test has only a restricted capability, namely, one of providing a passive output, like that of FIGS. 2 or 3.

We have now discovered a novel method that comprises closing the FIG. 4 Foucault open loop control system, so that the control action is somehow dependent on the output signal. In this way, for example, an output signal of the detection component 40 can have a dynamic effect upon an input quantity to the imaging device component 32, in such a manner as to realize (or maintain) a desired output value (e.g., the FIG. 2 ideal profile).

The present invention, accordingly, provides a closed loop Foucault method, which method comprises the steps of:

(1) providing an optical assembly along an open loop forward path, the optical assembly comprising:
 (a) an optical sample to be tested;
 (b) an input source of radiation directed along a reference axis to the optical sample;
 (c) a detection means aligned on the source reference axis, for detecting the radiation imaged by the optical sample, and outputting an information signal; and
 (d) a knife-edge capable of being positioned in a series of knife-edge position steps, for cutting the radiation imaged by the optical sample under test; and (2) closing a feedback loop around the optical assembly, for transmitting a controlled action to the optical sample in response to the information signal.

The present invention, as defined, has an advantage in that a human being can be added to the FIG. 1 optical assembly 10, for the purpose of realizing the feedback loop, and of sensing the actual value of the information signal. If the information signal does not have a desired value (e.g., the FIG. 2 profile), he can transmit a controlled action to the optical sample, for example, a position displacement, or a controlled force, to achieve the desired value.

Preferably, however, and as disclosed in detail below, the feedback action provided by the human being, may be significantly improved, by replacing the human being by an electrical computing means, for quantitatively comparing the information signal with a desired value. The computing means, in turn, then preferably provides a command signal to at least one mechanical force or position actuator, for transmission to the optical sample.

A further advantage of the present invention is that the feedback action can be continuous or discontinuous. Continuous control implies that the information signal is continuously being fed back, in time, and compared with the desired value. Restated, continuous control can be realized in correspondence with the real-time positioning of the knife-edge. Discontinuous control, on the other hand, implies that the input and output quantities are periodically sampled and compared, say at the beginning and end of one cycle of knife-edge positioning steps.

BRIEF DESCRIPTION OF THE DRAWING

The invention is illustrated in the accompanying drawing, in which:

FIG. 1 shows an optical assembly for using the Foucault knife-edge test;

FIGS. 2A-D show shadow patterns generated by an ideal imaging device undergoing the FIG. 1 knife-edge test;

FIGS. 3A-D show shadow patterns generated by a non-ideal imaging device undergoing the FIG. 1 knife-edge test;

FIG. 4 shows an open loop control system derived from the FIG. 1 optical assembly;

FIG. 5 shows a closed loop Foucault control system of the present invention;

FIGS. 7A-D comprise a family of curves that explain a first programming step of the present invention, for the case of a perfect imaging device;

FIGS. 8A-D comprise a family of curves that explain a first programming step of the present invention, for the case of a non-perfect imaging device;

FIGS. 9A-D comprise a family of curves generated in accordance with a second programming step of the present invention.

DETAILED DESCRIPTION OF THE INVENTION

Figure 6:
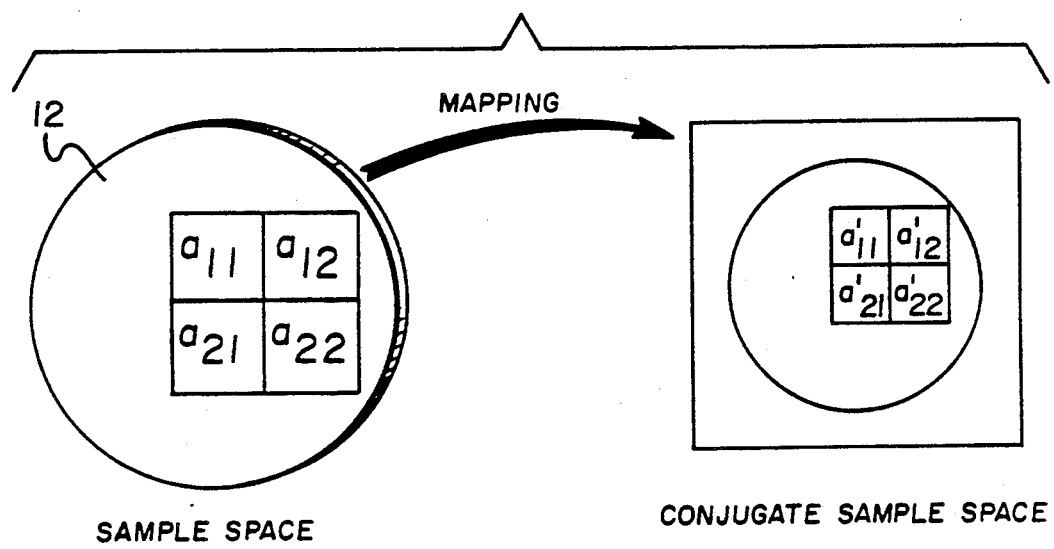
FIG. 6 is a heuristic to help explain definitions used in the present invention.

We summarize above method steps suitable for use in a closed loop Foucault knife-edge test. A preferred Foucault closed loop control system 44 is shown in FIG. 5.

The FIG. 5 control system 44 includes components connected in series along a forward path 46, and a feedback path 48, which is parallel to the forward path 46.

In particular, the components connected along the forward path 46 include a summing point 50; at least one conventional force actuator 52, which force actuator preferably comprises a force actuator of the type disclosed in U.S. Pat. No. 4,875,764 to Marino et al., and incorporated by reference herein; an optical sample 54 to be tested (which may, for example, comprise a lens or a mirror); and, a Foucault knife-test assembly 56, which assembly comprises a radiation source 58; a collector lens 60; a knife-edge 62; and a detection means 64 comprising a conventional photodetector comprising a matrix (m × n) array of charge coupled or charge injection devices. The detection means 64 outputs an information signal, in a well-known way, along the forward path 46, to a conventional computing means 66, for example, a Hewlett Packard Vectra ES. The computing means 66, in turn, can transmit a command signal along the feedback path 48, to the summing point 50.

The structure of the FIG. 5 closed loop control system 44 has now been disclosed, and we therefore turn our attention to its operation, in conjunction with the Foucault testing of the optical sample 54.

The Foucault testing of the optical sample 54 may be carried out in a manner substantially identical to that specified above with respect to FIG. 1. However, since the feedback path 48 has now been added, important new capabilities are available for correcting the optical sample 54, while it is being tested. To this end, for example, the computing means 66 may be programmed to ask, in effect:

(1) Is the information signal in correspondence to the ideal profile shown in FIG. 2? If yes, stop the Foucault testing.
(2) Is the information signal not in correspondence to the ideal profile shown in FIG. 2, (so that, for example, it corresponds to FIG. 3)? If yes, continue the Foucault testing, and apply (by way of the force actuator 52) a command signal comprising a controlled force action F to the optical sample 54. (Note, in this regard, that the operation of the summing point 50 acts to input the controlled force F to the optical sample 54, whatever some initial force $F_i$ may have originally been input along the forward path 46).

In furtherance of this new, dynamic capability, we now disclose a preferred method for computing (in the FIG. 5 computing means 66) a quantified command signal for input to the force actuator 52. In particular, the preferred method quantifies the magnitude of a wavefront slope aberration. In turn, the force actuator 52 may be commanded to operate so as to drive the computed slope value to zero. This action, finally, may be shown to "close the loop", since a slope value driven to zero corresponds to the program (1) above, where the Foucault testing is stopped when the information signal is in correspondence to the ideal profile shown in FIG. 2.

The computing means 66, accordingly, may be programmed for employment in conjunction with a Foucault knife-edge test assembly, the assembly comprising:
(a) an optical sample to be tested, (for example, a lens) the optical sample defining a sample space;
(b) a source of radiation directed along a reference axis to the optical sample;
(c) a detection means (for example, a photodetector) aligned on the source reference axis, for detecting the radiation imaged by the optical sample, the detection means defining a conjugate sample space, with respect to the optical sample space; and
(d) a knife-edge capable of being positioned in a series of knife-edge position steps, for cutting the radiation imaged by the optical sample, thereby producing a variable radiation pattern in the conjugate sample space; the program comprising the steps of:
  (1) determining, for each of a plurality of predetermined areas in the conjugate sample space, a radiation reference intensity parameter, based on the knife-edge positioned in a fully occluded, and fully non-occluded position;
  (2) positioning the knife-edge through a sequence of discrete positioning steps for generating a family of variable radiation intensity patterns in the conjugate sample space, wherein each member of the variable radiation patterns is a function of knife-edge position, and a function of each predetermined area in the conjugate sample space; and
  (3) computing for each member of the family of variable radiation patterns, an interpolated knife-edge position.

We have asserted that the optical sample to be tested, i.e., the lens, defines a "sample space", and that the radiation imaged by the sample can be detected by the detection means (the photodetector), the detection means, in turn, defining a "conjugate sample space" with respect to the lens sample space.

FIG. 6 illustrates a sample space, and a corresponding conjugate sample space. In particular, the FIG. 6 illustration follows from the fact that the radiation incident to the photodetector, corresponds to the conjugate image of an entrance pupil defined by the optical sample (lens) under test. The FIG. 6 sample space, therefore, can be thought of as an identifier or label given to the lens, once the lens has been divided up into a plurality of predetermined areas comprising an array of matrix cells. In order to illustrate this concept throughout the rest of this description, we define the sample space and its conjugate sample space to each comprise a square matrix $(2 \times 2)$, in correspondence with a CID matrix array. Radiation imaged from each of the plurality of predetermined sample space matrix cells ($a_{11}$, $a_{12}$, $a_{21}$, $a_{22}$) may be isomorphically mapped (by way of a collector lens) to one of a plurality of corresponding and predetermined areas or matrix cells in the conjugate sample space ($a_{11}$, $a_{12}$, $a_{21}$, $a_{22}$).

Note that the FIG. 6 square matrices $(2 \times 2)$ are merely exemplary, and that in a preferred embodiment, the matrices may be enlarged to, for example, $(512 \times 512)$ predetermined areas.

We now turn our attention to a detailed description of each of the three program steps summarized above.

Program Step 1: Determining, for each of a plurality of predetermined areas in the conjugate sample space, a reference intensity parameter based on the knife-edge positioned in a fully occluded, and fully non-occluded position.

Step 1 expresses in words an idea developed mathematically in both FIGS. 7 and 8. In particular, FIG. 7 develops step 1 for the case of a perfect sample to be tested, while FIG. 8 develops step 1 for the case of a non-perfect or aberrated sample to be tested.

FIG. 7, accordingly, shows a family of curves (FIGS. 7A, B, C, D). Each of these curves corresponds to one of the plurality of four predetermined areas ($a_{11}$, $a_{12}$, $a_{21}$, $a_{22}$) in the conjugate sample space of FIG. 6. Each of the curves, moreover, is substantially the same i.e., each provides a relationship of intensity (I) versus knife-edge position (P) for the two extreme knife-edge positions (fully non-occluded, fully occluded). Further, each of the curves is substantially piecewise linear, with a sharp break at a reference point $R_o$. $R_o$ is defined to be a reference knife-edge position, and corresponds to that point in the assembly where the knife-edge precisely touches the reference axis, at the normal, thereby totally occluding the imaging device to be tested.

The FIG. 7 family of curves has a piecewise linear profile, with a nearly 90° break point, and a substantial identity of form, because they have been generated, as stated, by a perfect lens. In other words, each of the predetermined areas ($a_{11}$, $a_{12}$, $a_{21}$, $a_{22}$) of the sample space of the perfect lens comprises a substantially identical radius of curvature i.e., by definition, there are no inherent aberrations in the perfect lens. Accordingly, the members of the FIG. 7 family of curves, which curves express the sample space as mapped into the conjugate sample space, are substantially identical and piecewise linear.

Continuing, step 1 requires determining, for each of the curves (FIG. 7A, B, C, D), a reference intensity parameter ($I_R$), where $I_R$ may be determined based on the knife-edge being positioned first in a fully occluded, and then a fully non-occluded position (or vice versa). (Also note that the reference intensity parameter $I_R$ can be obtained by holding the knife-edge in a fixed position, and moving the focused image of the radiation source across the knife-edge). Since the fully occluded position corresponds to an intensity $I_{minimum} \cong 0$ watts, and the fully non-occluded position corresponds to an intensity $I_{maximum} = I_{max}$ watts (both as measured by the photodetector) a preferred reference intensity parameter ($I_R$) may be computed by averaging $I_{min}$ and $I_{max}$:

$$I_R = \frac{I_{max} - I_{min}}{2}. \quad (1)$$

The program step 1 is now analyzed for the case where the perfect lens is replaced by a non-perfect or aberrated lens. The action of sequentially positioning the knife-edge at the extreme positions, fully occluded and fully non-occluded, can generate a family of curves of the type shown in FIGS. 8A-D. Here, each of the curves corresponds to one of the plurality of four predetermined areas ($a_{11}$, $a_{12}$, $a_{21}$, $a_{22}$) in the conjugate sample space of FIG. 6. Each of the FIG. 8 curves, however, may not be substantially the same, as they were in FIG. 7 for the case of the perfect lens. In fact, each of the curves may be arbitrary, due to arbitrary radii of curvature that indeed characterize the non-perfect lens. However, it can be stated that each of the curves in the FIG. 8 family, corresponds to a mathematical real and monotonically decreasing function, so that each of the curves continuously falls off from a maximum intensity ($I_{max}$), to some lower minimum intensity $I_{min}$.

It may be observed at this point, that a crucial advantage of the present invention is that one does not need to know the exact mathematical expression of each of the FIG. 8 curves. For the present invention, it is merely sufficient to know a finite number of sampled, discrete pairs of variables ($I_{ordinate}$, $P_{abscissa}$). This is discussed more fully below.

Finally, the program step 1 requires determining, for each of the curves (FIG. 8A, B, C, D), a reference intensity ($I_R$). $I_R$ may be expressed by equation (1) above, and computed in the same manner as for the perfect lens, by averaging the intensities generated by the two extreme knife-edge positions i.e., fully occluded, and fully non-occluded.

To review the program step 1, it should be clear that for either the perfect lens (FIG. 7) or non-perfect lens (FIG. 8), step 1 comprises generating a family of reference intensity parameters, ($I_{R1}$, $I_{R2}$, $I_{R3}$, $I_{R4}$), derived from computations computed for each of the predetermined areas in the conjugate sample space. Step 1 is preferably executed by the computing means 66, along the lines detailed above for both FIGS. 7 and 8. The computing means 66 preferably stores in a memory the family of reference intensity ($I_R$) parameters, for subsequent operation in the program step 3.

Program Step 2: Positioning the knife-edge through a sequence of discrete positioning steps, for generating a family of variable radiation intensity patterns in the conjugate sample space, wherein each member of the family is a function of knife-edge position, and a function of each predetermined area in the conjugate sample space.

Step 2 expresses in words an idea developed mathematically in FIGS. 9A-D. In particular, FIGS. 9A-D comprise a family of four curves as generated from a non-perfect lens. Each of the curves provides an example of a function dedicated to one of the four predetermined areas ($a_{11}$, $a_{12}$, $a_{21}$, $a_{22}$) in the FIG. 6 conjugate sample space. Further, each function is a plot of discrete knife-edge position (P) versus radiation intensity (I). Actual sampled points (10) for each function, shown as little circles, may be generated in the following way.

First, the knife-edge may be positioned at a first position $P = 1$ unit. This action, in turn, blocks some of the radiation from the source, so that a radiation intensity number $I_1$ may be registered by the photodetector, for each of the predetermined areas in the conjugate sample space. The set of intensity numbers, so generated, may be transmitted to the computing means 66, along the forward path 46. The set of intensity numbers corresponds to a first set of sampled, discrete pairs of variables (knife-edge position ($P_1$), intensity ($I_1$)), as shown by way of the FIG. 9 little circles.

Second, the knife-edge may be positioned at a second position $P = 2$ units. This action, in turn, further blocks some of the radiation from the source, so that a new and second set of radiation intensity numbers may be registered by the photodetector, again for each of the predetermined areas in the conjugate sample space. The second set of intensity numbers, so generated, may be inputted to the computing means 66, along the forward path 46. The second set of intensity numbers corresponds to a second set of sampled, discrete pair of variables (knife-edge position ($P_2$), intensity ($I_2$)), as shown by way of the FIG. 9 little circles.

This process of re-positioning the knife-edge to third, fourth, fifth position units, etc., may be repeated for any finite number of desired knife-edge position units. (Note that this process can also be effected by holding the knife-edge in a fixed position, and step-wise moving the focused image of the radiation source across the knife-edge). Preferably, the re-positioning process is repeated more times, rather than fewer times, to ultimately provide a greater quantitative accuracy in the Foucault method. On the other hand, the trade-off to an exceptionally high number of process repetitions and hence greater quantitative accuracy, for example, greater than 20 repetitions, may be increased computer time or expense.

Program Step 3: Computing for each member of the family of variable radiation patterns, an interpolated knife-edge position.

As just detailed, the second step of the program generates a family of variable radiation patterns in the conjugate sample space. An example of the family of radiation patterns is that generated above in FIGS. 9A-D. We reprint one of these patterns (FIG. 9A), as FIG. 10, in order to illustrate the present program step 3. It is to be understood that the third step, as detailed below in relation to FIG. 10, is actually repeated by the computing means 66, mutatis mutandis, for each of the four predetermined areas that actually comprise the FIG. 9 family of radiation patterns.

Figure 10:
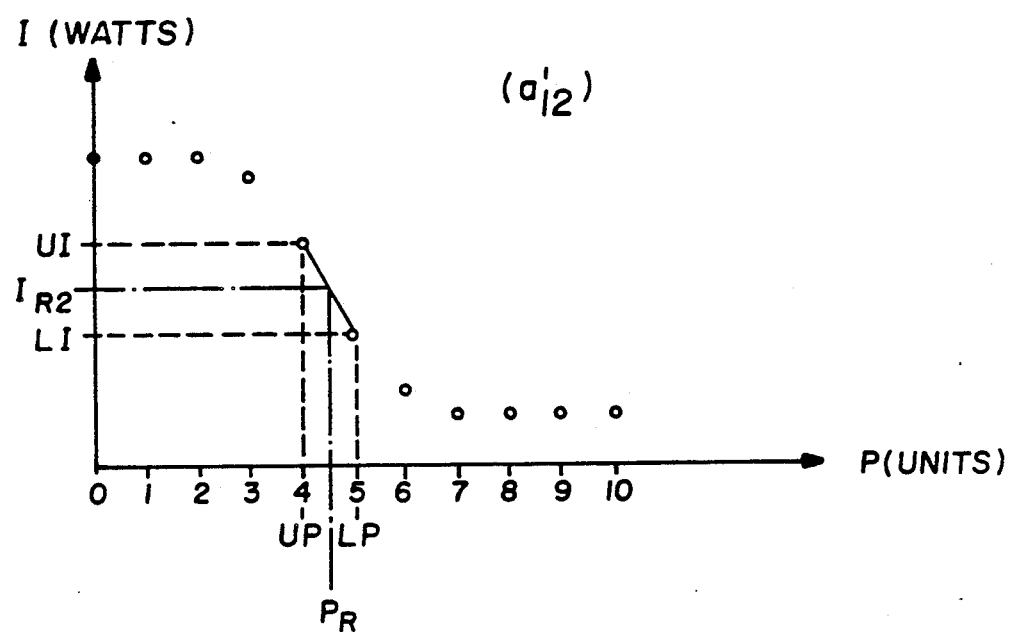
FIG. 10 is a function generated in accordance with a third programming step of the present invention.

FIG. 10, accordingly, comprises a radiation function for one of the predetermined areas ($a_{12}$) in the conjugate sample space. It is a plot of knife-edge position (P) versus intensity (I), with position denoted in units, and intensities denoted in watts. The little circles indicate discrete, knife-edge position sample points.

Since FIG. 10 in fact provides only discrete sample points, it should be graphically clear that a precise knife-edge position $P_R$, which corresponds to the known intensity parameter $I_R$ (from step 1), is, in the general case, unknown at this moment. It is the objective of program step 3 to precisely determine $P_R$, for the following reasons.

A quantitatively precise determination of $P_R$ enables one to exploit the following equation (2), so as to arrive at a quantitative interpretation of the imaging device's characteristics:

$$\frac{P_R}{R_C} = \text{magnitude of wavefront slope aberration} \quad (2)$$

Equation (2) states that the quotient of the knife-edge position $P_R$, divided by a radius of curvature $R_C$, where $R_C$ is a measurable radius from the knife-edge to a location where we choose to characterize the wavefront, namely, the surface of the optical sample under test, is proportional to the magnitude of the wavefront slope aberration.

With this motivation, therefore, we return to FIG. 10 and program step 3, for instructions on how to precisely determine the knife-edge position, $P_R$.

The knife-edge position $P_R$ is preferably given by the following linear, hence interpolated, equation (3):

$$P_R = \frac{1}{m}(I_R - LI) + LI, \quad (3)$$

where m is the slope of a straight line between the points UI, UP and LI, LP. With reference to FIG. 10, UI is defined as an upper intensity point; LI is defined as a lower intensity point; UP is defined as an upper position point; and, LP is defined as a lower position point. More specifically, based on these definitions, the slope m may be expressed by equation (4):

$$m = \frac{UI - LI}{UP - LP}. \quad (4)$$

There remains the question, how are the variables (UI, UP) and (LI, LP) quantitatively determined? The question is preferably answered by way of the following program/example.

First, for each discrete, sampled point in the FIG. 10 curve, a comparison is made as to whether or not the intensity I is greater than the known intensity parameter $I_R$ (from step 1). If I is greater than $I_R$, the program stores in memory the immediate values of intensity (UI) and position (UP), and then advances to the next discrete, sampled point. Assume now, that this value I is below that of $I_R$. Then, the program recalls from memory the last stored values, namely, UI and UP, and saves the immediate intensity and position, as LI and LP, respectively. In review, these numbers (UI, UP) and (LI, LP), are processed through equations (4), (3) and (2) supra, so that the computing means 66 arrives at the quantitative wavefront slope aberration that is a measure of the optical sample's 54 characteristics.

The computing means 66, as disclosed above, transmits the command signal to the force actuator 52 (along the feedback path 48), the command signal being such as to drive the just computed wavefront slope value, to zero. This action, therefore, closes the FIG. 5 loop.

We note, finally, as an alternative embodiment, that it may be advantageous to use the force actuator 52 in conjunction with an auxiliary compensator device (not shown), which compensator device is in operative association with the optical sample 54. In brief, in some optical assemblies, advantages of ease of installation, and efficiencies of Foucault testing, may be realized by correcting the optical sample 54 aberrations, by way of the compensator device.

We claim:

1. A closed loop Foucault method, which method comprises the steps of:
   (1) providing an optical assembly along an open loop forward path, the optical assembly comprising:
      (a) an optical sample to be tested;
      (b) an input source of radiation directed along a reference axis to the optical sample;
      (c) a detection means aligned on the source reference axis, for detecting the radiation imaged by the optical sample, and outputting an information signal; and
      (d) a knife-edge capable of being positioned in a series of knife-edge position steps, for cutting the radiation imaged by the optical sample under test;
   (2) closing a feedback loop around the optical assembly,;
   (3) transmitting along the feedback loop a controlled action to the optical sample, the controlled action derived from a step comprising
   (4) processing in a computing means the information signal by quantitatively comparing the information signal to an ideal knife-edge shadow profile.

2. A method according to claim 1, comprising the step of transmitting a controlled action to the optical sample, until the information signal is in correspondence to the ideal knife-edge shadow profile.

3. A method according to claim 1, comprising the step of processing the information signal by computing the magnitude of a wavefront slope.

4. A method according to claim 3 comprising the step of transmitting a controlled force to the optical sample, so as to drive the magnitude of the wavefront slope, to zero.

* * * * *

UNITED STATES PATENT AND TRADEMARK OFFICE
CERTIFICATE OF CORRECTION

PATENT NO. : 4,993,831

DATED : February 19, 1991

INVENTOR(S) : Donald E. Vandenberg, et al

It is certified that error appears in the above-identified patent and that said Letters Patent is hereby corrected as shown below:

| | |
|---|---|
| Col. 6, line 19 | delete "$(a_{11}, a_{12}, a_{21}, a_{22})$" and substitute therefor --$(a'_{11}, a'_{12}, a'_{21}, a'_{22})$--; |
| Col. 6, lines 38-39 | delete "$(a_{11}, a_{12}, a_{21}, a_{22})$" and substitute therefor --$(a'_{11}, a'_{12}, a'_{21}, a'_{22})$--; |
| Col. 7, line 19 | delete "$(a_{11}, a_{12}, a_{21}, a_{22})$" and substitute therefor --$(a'_{11}, a'_{12}, a'_{21}, a'_{22})$--; |
| Col. 7, line 67 | delete "$(a_{11}, a_{12}, a_{21}, a_{22})$" and substitute therefor --$(a'_{11}, a'_{12}, a'_{21}, a'_{22})$--; |
| Col. 8, line 57 | delete "$(a_{12})$" and substitute therefor --$(a'_{12})$--; |
| Col. 10, lines 33-34 | after "assembly", change ",;" to --;--. |

Signed and Sealed this

Seventh Day of July, 1992

Attest:

DOUGLAS B. COMER

Attesting Officer   Acting Commissioner of Patents and Trademarks